United States Patent [19]

Doerr

[11] Patent Number: 4,553,881

[45] Date of Patent: Nov. 19, 1985

[54] SLURRY PUMP TRAM CONTROL APPARATUS

[75] Inventor: Richard E. Doerr, Morgantown, W. Va.

[73] Assignee: Conoco Inc., Ponca City, Okla.

[21] Appl. No.: 171,605

[22] Filed: Jul. 23, 1980

[51] Int. Cl.⁴ .................... B65G 53/66; B65G 53/34
[52] U.S. Cl. ..................................... 406/115; 406/31
[58] Field of Search .................. 406/19, 29, 31, 113, 406/114, 115, 116; 37/58; 239/186; 15/1.7, 246.5; 210/221.2, 513, 520, 523, 524, 525

[56] References Cited

U.S. PATENT DOCUMENTS

| | | | |
|---|---|---|---|
| 3,238,549 | 3/1966 | Burlin et al. | 15/1.7 |
| 3,545,618 | 12/1970 | Greg et al. | 15/246.5 X |
| 3,690,731 | 9/1972 | Mylting | 406/115 X |
| 4,143,921 | 3/1979 | Sweeney et al. | 406/115 |
| 4,278,365 | 7/1981 | Sandberg | 406/31 X |

Primary Examiner—Jeffrey V. Nase
Attorney, Agent, or Firm—William J. Miller

[57] ABSTRACT

Method and apparatus are described for removing material from a sump. The sump has substantially parallel and elongated sidewalls and has a longitudinal axis. The sump is enclosed with ends and a bottom and is adapted for filling with a water-solid mixture to form a slurry. A suction pump is mounted above the sump and extends into the sump for removal of the water and solid material. Apparatus is attached to the suction pump for moving the suction pump along the longitudinal axis of the sump. When the suction pump reaches the end of the sump, apparatus rotates the suction pump through 180 degrees and then the moving apparatus again moves the sump along the longitudinal axis to the other end where it is again rotated in the opposite direction through 180 degrees to the original point for repeating the process.

4 Claims, 5 Drawing Figures

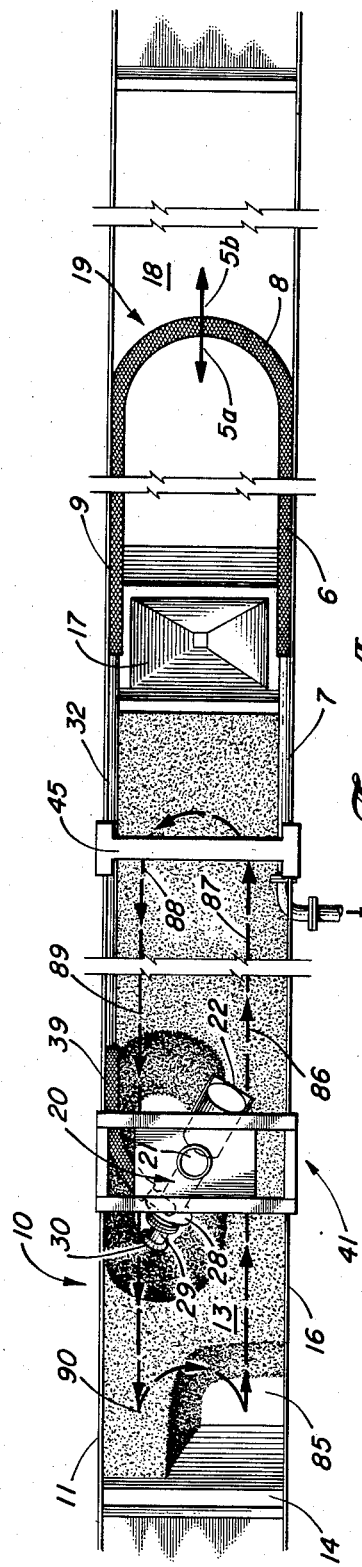
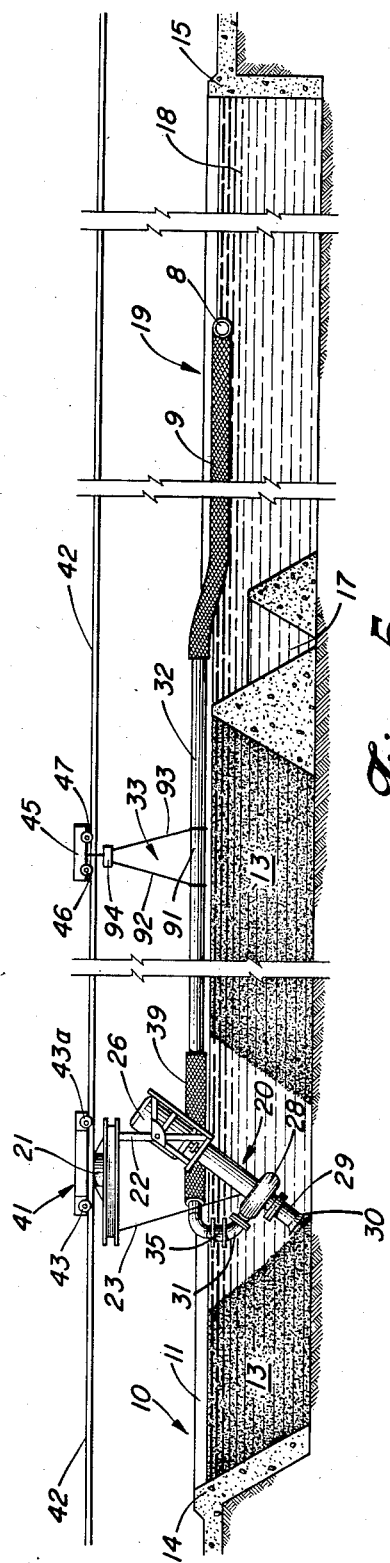

SLURRY PUMP TRAM CONTROL APPARATUS

BRIEF DESCRIPTION OF THE PRIOR ART

In the transportation of a coal-water mixture through a pipeline in the form of a slurry, one element of the transportation system usually comprises a surge sump. Seldom is the transportation system designed to operate with a surge input since the efficiency would be drastically reduced. Prior patents have suggested various surge sumps.

One such patent is issued to Richard E. Doerr, David L. McCain, and Hilbert D. Dahl as U.S. Pat. No. 3,870,373. In that patent, the bottom of the sump is sloped by an amount exceeding the angle of repose of the coal-water mixture. At the bottom of the sump, a pump inlet removes the material in the form of a coal-water slurry.

U.S. Pat. No. 3,981,541 issued to the same inventors as the above-referenced patent discloses a long, shallow sump suitable for forming a slurry. Coal and water are added to the sump as they are mined from a remote mining face, and a pump centrally located is operated to remove the slurry.

A patent to Victor V. Greg, U.S. Pat. No. 3,545,618 discloses a sump used in a quenching station and involves a rotating suction pipe mounted to a carriage adapted to traverse the length of the sump. In this patent the carriage includes a turntable which continuously rotates the suction inlet pipe in a 360° circle as the carriage moves along the length of the sump.

The patent to Sabin, U.S. Pat. No. 2,265,046, discloses a turntable in a sump, but the turntable is only used as a stirring apparatus.

None of the patents disclose a sump having a turntable connected to a pump so that the pump and the mouth of the pump can traverse a path parallel to the sidewalls of the sump, rotate through 180°, traverse the length of the sump next to the other sidewall and rotate back 180° to its starting position.

BRIEF DESCRIPTION OF THE INVENTION

This invention comprises a shallow, elongated sump having parallel sidewalls, ends, and substantially flat bottom. The sump is adapted for filling with water and solid matter such as coal. A suction pump is mounted on rails above the sump and is adapted to move along the longitudinal axis of the sump parallel to the sidewalls. The pump will move adjacent or next to one sidewall; and, when it reaches the end of the sump, it will be accurately rotated through substantially 180 degrees to the other side of the sump where it will again move along a line which is substantially parallel to the sidewall of the sump. Upon reaching the opposite end, it will again be rotated, however, in the opposite direction to the original starting position where the above process will be repeated. The suction line contains concentration measuring apparatus so that the speed that the pump is trammed will be dependent solely upon the concentration being sucked up into the pump. That is, the higher the concentration, the slower the sump will be trammed—the object being to maintain approximately 40 to 50 percent concentration of slurry from the sump.

RELATED APPLICATIONS

An application entitled "Slurry Pump from Control Apparatus" by the same inventor as this application, Ser. No. 171,600 and filed concurrent with this application is related to this application.

BRIEF DESCRIPTION OF THE FIGURES

FIG. 4 is a top view of a sump illustrating the operation of the sump; and

FIG. 5 is a side cross-sectional view taken along the longitudinal axis of the sump and illustrating the operation of the suction pump inside the sump.

DETAILED DESCRIPTION OF THE INVENTION

Figure 1:
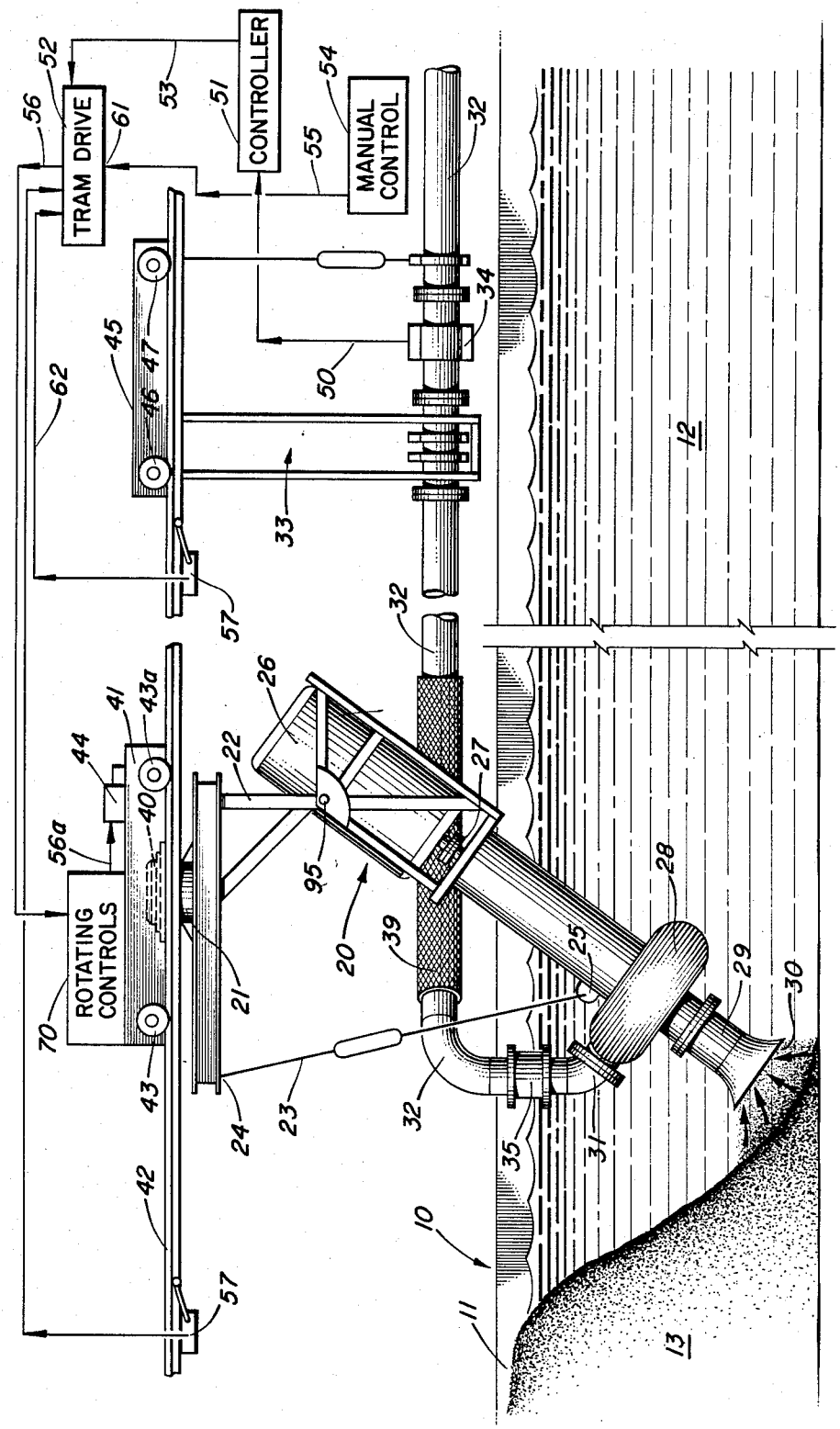
FIG. 1 is a partial view of a sump showing the pump and support mechanism for the pump along with the control mechanism for the tramming of the pump.
Figure 2:
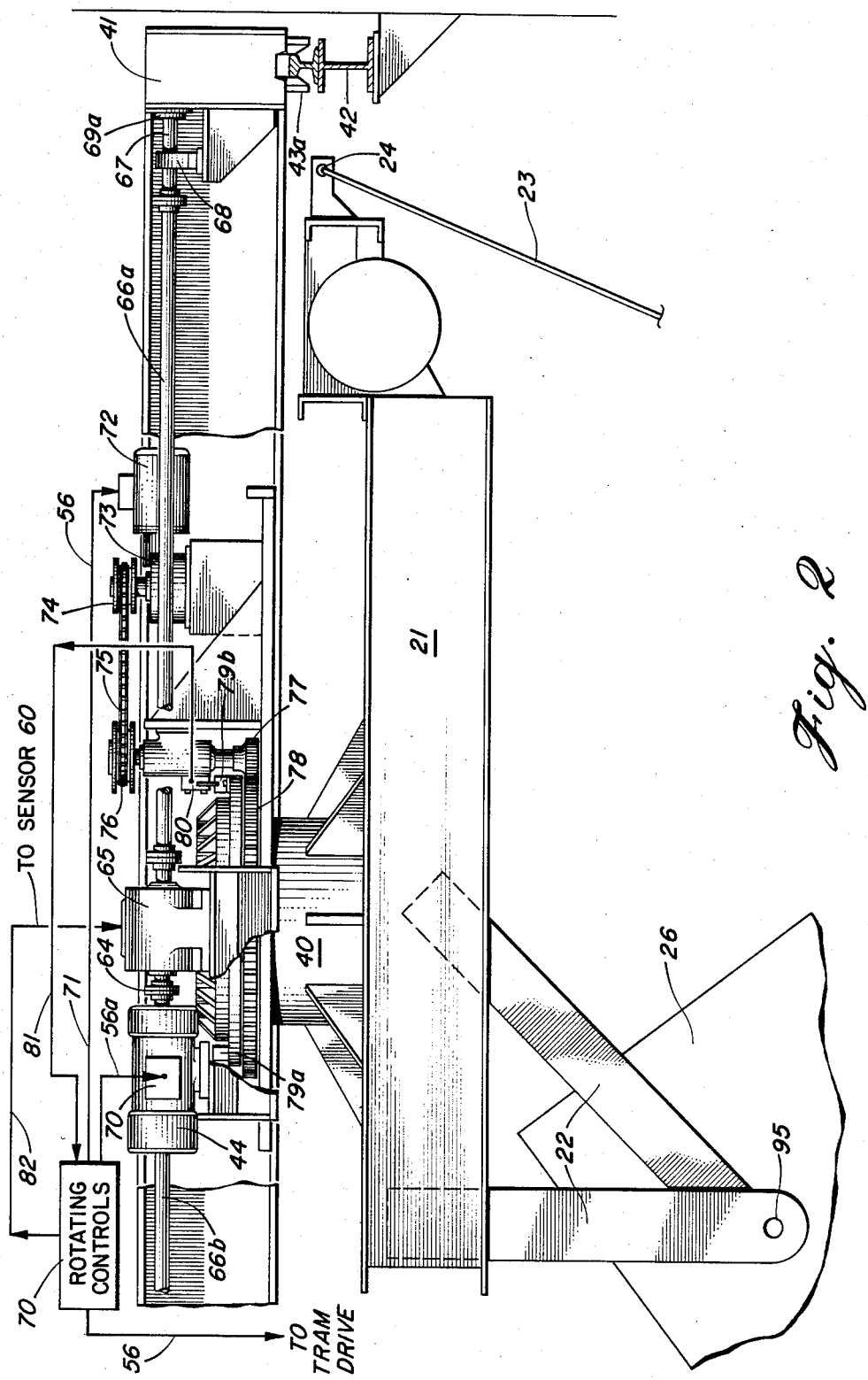
FIG. 2 is an end view of the overhead support apparatus and turntable for the suction pump.
Figure 3:
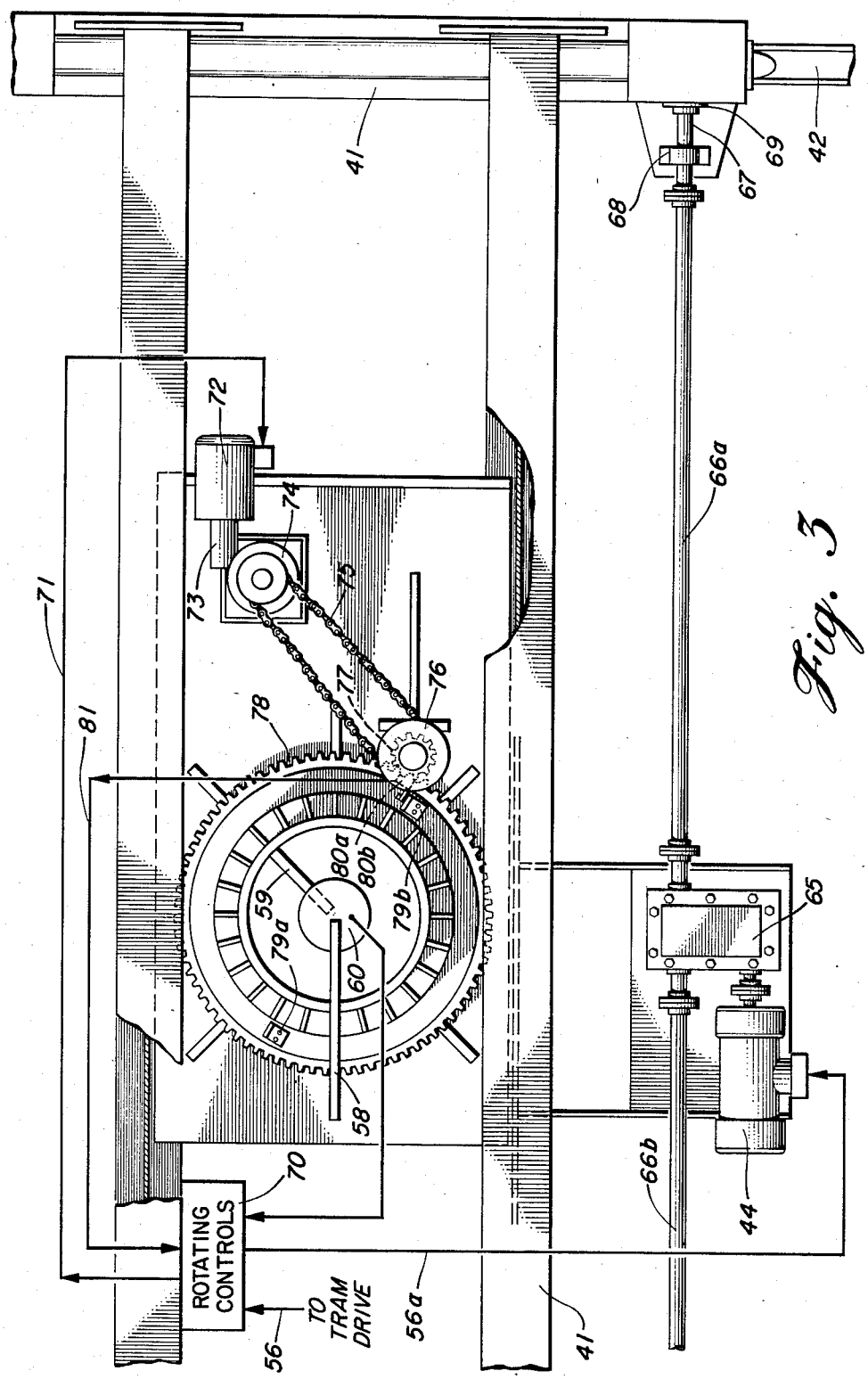
FIG. 3 is a top view of the apparatus illustrated in FIG. 2.

Referring to all of the figures, but in particular to FIGS. 1, 2 and 3, a sump, generally referred to by the arrow 10, has a sidewall 11, and contains a fluid such as water 12 therein. Solid material such as coal, illustrated by the number 13, is also emptied into the sump from pipes positioned along the side of the sump. These pipes are not illustrated but are well known in the art and will not be described in detail in this application. It should be sufficient to state that the pipes are connected to remote mining locations where solids and liquid are emptied into transportation means such as pipes and pumped to the centrally located sump 10. In the preferred embodiment, the solid is coal and the liquid is water. To simplify the explanation, coal and water will be used to describe the invention. There the water and coal mixture is emptied into the sump where it is allowed to accumulate as illustrated by material 13.

A pump apparatus 20 is suspended from a turntable 21 by a first supporting apparatus 22 and a cable apparatus 23 which is attached to turntable 21 at point 24 and to pump apparatus 20 at a location 25. Supporting apparatus 22 will provide mounting for a pump motor 26 coupled through a shaft 27 to a pump 28 which has a rotor (not shown) coupled to shaft 27. An intake tube 29 has a mouth 30 which provides an inlet for coal 13 and water 12 mixture. An outlet 31 is coupled through a pipe 32 to a second support apparatus generally referred to by arrow 33.

A radiation detector 34 is connected across pipe 32 and measures the concentration of the coal-water slurry passing through it. Pipe 32 is connected to a floating section 19 (see FIG. 4) which provides for additional pipe as the pump apparatus is trammed along the longitudinal axis of the sump. Floating pipe 19 is better illustrated when reference is made to subsequent FIGS. 4 and 5 which will be described in a later portion of the specification.

Turntable 21 is rotatably supported through a turntable apparatus 40 which, in turn, is mounted to a carriage 41. A pipe swivel joint 35 is located between pump outlet 31 and pipe 32 to allow free turntable rotation without the outlet piping restricting this motion. A portion of pipe 39 is made flexible to further aid in this freedom of rotation. Carriage 41 is supported above sump 10 by means of a pair of rails 42 and wheels 43 and 43a which are attached to carriage 41. Each of the pair of rails is located on opposite sides and above sump 10. A motor 44 is mounted on carriage 41 and is coupled to wheels 43a through a system which will be better described when reference is made to FIG. 2. Second support apparatus 33 for pipe 32 likewise comprises a carriage 45 having wheels 46 and 47 which are supported by rail pair 42.

The basic components for control of the concentration of the sump suction pump are the radiation detector 34 and a controller 51. Radiation detector 34 measures, in the usual manner, the concentration of the slurry in pipe 32 and sends its output along a wire 50 to a controller 51. Controller 51 converts the information in radiation detector 34 to an output which is coupled through a wire 53 to a tram drive 52 to an input 61a of tram drive controller 52 which controls the tramming rate of pump apparatus 20. A manual control 54 which can override the automatic control is also provided by a circuit which has its output coupled through a wire 55 to another input 61b of tram drive 52. The output from tram drive 52 is coupled through a wire means 56 to motor 44.

A plurality of microswitches 57 is positioned along the rail to indicate the position of the pump apparatus, particularly the locations where the pump has traveled its full distance and must be stopped, reversed, and trammed in th.e opposite direction. An output along wire means 62 is coupled to tram drive 52 to provide electrical position information to tram drive control system 52.

Referring to FIGS. 2 and 3, a more detailed drawing of the turntable apparatus 40 and carriage 41 is illustrated, Carriage 41,, as previously described, is moved by motor 44 which is coupled through its shaft to a coupling means 64, to a gearbox 65. Extending from gearbox 65 is a pair of shafts 66a and 66b which connect to wheels 43a and to wheels not shown, respectively, as previously described in FIG. 1.

The coupling between shaft 66a and a hub 69a of wheel 43a is made through a smaller shaft 67 which is journaled in a bearing 68. Motor 44 can operate in either direction so that the carriage 41 can move in either direction along track 42. Output from rotating controls 70 is communicated through wire 56a to motor 44 by means of junction box 71. Output from rotating controls 70 is also communicated through wire 56 to turntable motor 72 which is coupled through a drive 73 to a sprocket drive 74 which, in turn, is coupled through a chain 75 to a second sprocket drive 76. A gear 77 attached to sprocket drive 76 is coupled to a gear 78 of turntable 40. Turntable 40 includes two cams, 79a and 79b, which are coupled to a switch means 80 which includes switches 80a and 80b which, in turn, are electrically coupled through wire means 81 to rotating control 70.

As turntable 40 rotates, rotational sensor 60, which is connected to the nonrotating carriage 41 by link 58 and to the rotating turntable 40 by link 59, changes its output which communicates its output rotating control 70 by wire 82. Rotational sensor 60 may be a potentiometer with the stator connected to link 58 and the rotor connected to link 59. Rotational information is then derived by generating a voltage which corresponds to the angular position of the rotor with respect to the stator of the potentiometer.

Operation

The operation of the apparatus illustrated in FIGS. 1 through 3 is better described when reference is made to FIGS. 4 and 5. Referring to FIGS. 4 and 5, the entire sump 10 is viewed. In addition to the description given in the previous figures, sump 10 contains a first end 14 and a second end 15 with a first sidewall 11 and a second sidewall 16. In between intermediate ends 14 and 15 is a fines collection settling region 17 and a water reservoir region 18. Pipe 32 has a flexible portion 19 which, as illustrated, floats on the surface of water in water reservoir region 18.

In previous sumps, the normal method for emptying the sump has usually been to tram the pump from one end of the sump to the other end of the sump and to move the suction apparatus which essentially comprises the pump 28, pipe 29, and inlet 30 in a back and forth movement from side 11 to side 16. When the pump reaches the end of sump 14, for example, it is usually lifted out of the water and trammed back to the beginning of the sump and the process repeated.

The configuration of this invention, however, does not require the pump and its supporting apparatus to be lifted out of the sump and returned to the original position but, rather, a turntable is provided which rotates the pump through 180 degrees (or less) and then permits it to move back to the original position during which time it is removing material and water from the sump, thereby allowing the pump to remove material from the sump continuously.

Carriage 41 is generally moved to the region 85 shown in FIG. 4 where no material has been dumped into the sump—that is, region 85 is maintained substantially clear so that the pump 28 can be started in the sump without obstruction caused by material in the sump. Once the pump is started in sump 10, then a signal is initiated by controller 51 (see FIG. 1) through wire 53 to tram drive 52, which initiates a signal along wire 56 to motor 44 causing shafts 66a and 66b to turn wheels 43a in a direction to move the carriage 41 along a path 86 in the direction indicated by the arrow. The rate at which carriage 41 will move will be dependent upon the concentration being measured by radiation concentration measuring apparatus 34 which sends a signal representing the measured concentration through wire 50 to controller 51. When the concentration reaches the desired percent, which is determined by the operator, then the forward movement of carriage 41 will be controlled to maintain the concentration at the desired percent. Thus, the carriage will move rather rapidly at first, and once the concentration increases, the signal through wire 50 to controller 51 will reduce the forward movement of carriage 41 in a manner to maintain the concentration at the desired amount. It is obvious, of course, that if a different concentration is desired, controller 51 can be varied to adjust to the desired concentration. Once carriage 41 reaches the position indicated by 87, the forward movement in the direction of the arrow ceases and a signal along wire 56 between rotating control 70 and motor 72 causes the turntable 40 to be rotated. Motor 72 through gear drive 73 will rotate chain sprocket 74 causing chain 75 to rotate chain sprocket 76, thereby driving gears 77 and 78 in a manner to rotate turntable 40. Turntable 40 will rotate in a counterclockwise direction, as indicated by the arrow, to position 88. At that point, the rotational sensor 60 changes its output through wire 82 to rotating control 70, causing the rotate motor 72 to stop (see FIG. 3). Should the rotation sensor 60 fail to stop the motor 72 as a result of an, equipment failure, cam 79a or 79b will strike switches 80a or 80b, shutting off motor 72 by opening the circuit through wire 81. The movement of carriage 41 will then be reversed by a signal from controller 51 to tram drive 52 along wires 56 and 56a to motor 44. It is obvious that the operator (or the control system) can vary the total number of degrees that the turntable is rotated, therefore, the path can be varied either closer to the sidewalls 11 or 16 or closer to the longitudinal axis of the sump. The actual path will depend upon the actual accumulation of material in the sump at the time it is being removed by pump 20. The tram drive is now moving in a second path 89 parallel to sidewall 11 and in a reverse position as indicated by the arrows. Pump 28 and pipe 29 along with mouth 30 will move at a prescribed rate, maintaining the concentration as aforementioned until a position 90 is reached, whereupon the turntable will again be operated, moving the pump and its mouth 30 in a direction clockwise to the original starting position. Thereupon, the entire cycle will again be repeated.

As the carriage 41 is moving, it is obvious that lengthening and shortening of pipe 32 is necessary. This is accomplished by flexible portion of pipe 19, which is floating on water 18. The flotation is provided in any usual manner so long as sufficient flotation is provided enabling the pipe to remain on the surface during the pumping cycle.

Referring to FIG. 4, pipe 19 consists of a stationary portion 6, connected to outlet pipe 7, which in turn is connected to the hoist pump (not shown). A transition portion 8 moves in the direction of arrow 5a if pump 20 is moving toward end 14 or in the direction of 5b if pump 20 is moving in the direction of end 15. Thus, the flexible pipe 19 provides any lengthening or shortening of pipe 32 as necessary to accommodate movement of pump 20. Active section 9 of pipe 19 is connected to pipe 32.

The measurement of concentration has been described as being accomplished by a radiation detector 34. This device is well known in the art and will not be further described. It is also possible, however, to measure the concentration by weighing the pipe. Such a weighing apparatus is illustrated in FIG. 5 and basically comprises a section of pipe 91 which is supported by a pair of cables 92 and 93. These cables are connected into a weight measuring apparatus 94 which can be a strain gauge or other similar device. The function of the apparatus is similar to the radiation detector in that the weight of the pipe is dependent upon the concentration of the materials in it; and, once the weight is measured, the signal is transmitted from gauge 94 to controller 51 along wire 50 which circuit functions in precisely the same manner as that previously described for the radiation detector apparatus.

The controller 51 will need to be specified to accept a signal from strain gauge 94 or other weight measuring apparatus and convert same to suitable output for tram drive 52. For convenience, the motor support system for the pump 28 is pivoted at a point 95 so that, if necessary, cable 23 can be shortened and the pump lifted out of the water.

A manual control 54 can override controller 51 and thereby provide control by the operator of the positioning of the carriage 41. Thus, a signal from manual control 54 is provided through wire 55 to tram drive 52.

In an actual device built in accordance with this invention, controller 51 is a density indicating controller built by Fisher Corporation and is identified as a notch gain or TL-107 variable gain apparatus. The tram drive 52 is identified as a Reliance Corporation variable speed bidirectional apparatus, further identified as a solid state SCR-III variable speed motor control. The rotation sensor 60 is a resistance to current converter. The position indicator 61 is a Fisher TL-131 device. One important feature of the Fisher TL-107 variable gain controller is that it does provide a normal gain for a portion of its amplification, a reduced gain for the operational part of its amplification, and then a third gain for the remainder of the input to output signal. Thus, during the portion where the gain must be controlled, a reduced gain is possible. During a period of time, for example, during the initial startup when no material is being sucked in by pump 28, the gain is high, providing for a fast movement of the carriage 41. Once coal is encountered, the gain is reduced, causing a precisely controlled tram drive. If, for example, too much coal is being taken in, the gain is again increased, causing a rapid deceleration in tram drive, thereby providing a better control of the tram drive apparatus.

Conclusions

An apparatus has been disclosed for removing material from a sump in a manner which is highly controllable. Furthermore, the suction pump and associated apparatus can be easily moved along the sump from one end to the other and returned without wasted time removing the sump pump and returning it to the original starting position. The particular movement provided also thoroughly empties the sump during one downward and one return tramming of carriage 41. As previously mentioned, it also provides for an efficient method of maintaining the concentration at a particular preset value. Although a certain particular embodiment of the invention has been herein disclosed for purposes of explanation, various modifications thereof after study of the specification will be apparent to those skilled in the art to which the invention pertains.

What I claim is:

1. In a sump substantially parallel and elongated sidewalls defining a longitudinal axis, said sump having ends and a bottom, and adpated for filling with fluid and solid mixture, said sump including rail means positioned above and along the longitudinal axis of said sump, and carriage means for mounting a pump which extends into said sump and means for moving said carriage means along said rail means, said carriage means characterized by:
   (a) turntable means rotatably attached to said carriage means,
   (b) support means attached between said turntable means and said pump,
   (c) turntable rotating means attached between said carriage means and said turntable means for arcuately rotating said turntable means,
   (d) indicator means attached between said carriage and said turntable for generating an indication of the arcuate position of said turntable with respect to the longitudinal axis of said sump, and
   (e) tram drive means accepting said generated indication and operating said rotating means to position through rotation of said turntable, said pump means in said sump along a predetermined path parallel to the longitudinal path of said sump.

2. A sump as described in claim 1 including means for determining the position of said carriage means along said rail means and means coupling said determined position to said tram drive means to stop the continual movement of said carriage means along said rail means and to operate said turntable rotating means to position said pump in a new preselected path parallel to the longitudinal axis of said sump.

3. A sump as described in claim 1 or 2 including a longitudinal extension portion to said sump for water storage and flexible pipe means having a buoyancy sufficient to cause flotation of said flexible pipe means on the surface of said water storage portion of said sump whereby sufficient length of flexible pipe can be stored in said water storage to accommodate longitudinal movement of said carriage.

4. A sump as described in claim 3 wherein said flexible pipe means is in the configuration of two parallel sections interconnected with a "U"-shaped portion which provides a transition from a storage portion, through a transition "U" portion to an active portion which is coupled to said pump.

* * * * *